United States Patent [19]

Ogata

[11] Patent Number: 5,266,374
[45] Date of Patent: Nov. 30, 1993

[54] CARPET CONSTRUCTION PROVIDING NOISE SUPPRESSION

[75] Inventor: Hisashi Ogata, Kawasaki, Japan

[73] Assignee: Nissan Motor Co., Ltd., Yokohama, Japan

[21] Appl. No.: 669,436

[22] Filed: Mar. 13, 1991

[30] Foreign Application Priority Data

Mar. 15, 1990 [JP] Japan ................................ 2-66093

[51] Int. Cl.⁵ .......................... B32B 3/14; B60R 13/08
[52] U.S. Cl. ........................................ 428/77; 428/95;
428/189; 428/213; 428/215; 428/220;
428/904.4; 181/284; 181/285; 181/286;
181/290; 181/294; 296/39.3
[58] Field of Search ................ 428/77, 95, 189, 213,
428/215, 220, 904.4, 86, 423.9, 424.8, 424.7;
181/290, 286, 284, 285, 294; 296/39.3

[56] References Cited

U.S. PATENT DOCUMENTS

| | | | |
|---|---|---|---|
| 2,326,581 | 8/1943 | Van Cleef | 428/86 |
| 2,810,672 | 10/1957 | Taylor | 428/138 |
| 2,962,409 | 11/1960 | Ludlow | 428/86 |
| 3,196,315 | 7/1965 | Peterson | 428/95 |
| 3,298,457 | 1/1967 | Warnaka | 181/290 |
| 3,684,630 | 8/1972 | Sensenig | 161/36 |
| 4,579,764 | 4/1986 | Peoples | 428/95 |

FOREIGN PATENT DOCUMENTS

| | | |
|---|---|---|
| 2912805 | 10/1980 | Fed. Rep. of Germany . |
| 3200627 | 8/1983 | Fed. Rep. of Germany ..... 296/39.3 |
| 8901805.2 | 3/1989 | Fed. Rep. of Germany . |
| 142760 | 11/1981 | Japan ................................ 296/39.3 |
| 61-187757 | 11/1986 | Japan . |
| 2216081 | 10/1989 | United Kingdom . |

*Primary Examiner*—Ellis P. Robinson
*Assistant Examiner*—Nasser Ahmad
*Attorney, Agent, or Firm*—Foley & Lardner

[57] ABSTRACT

A plurality of small blocks are disposed between an upper flexible layer and a more rigid and thicker layer. The blocks prevent the compression of portions of the carpet surrounding the area on which a load, such as the passengers feet, is placed. By preventing the compression of the major portion of the carpet, essentially unchanged carpet transmitivity characteristics are maintained.

5 Claims, 5 Drawing Sheets

CARPET CONSTRUCTION PROVIDING NOISE SUPPRESSION

BACKGROUND OF THE INVENTION

1. Field of the Invention

The present invention generally relates to carpets, and more specifically to a carpet suited for preventing the transmission of vibration and sound into a vehicle cabin.

2. Description of the Prior Art

In order to shut out noise and bibration from the vehicle cabin, it is a common practice to insulate the various panels and components, such as the dashpanel, the roof, floor and the like. In addition, it is common to use rubber sheeting, felt carpet and the like, and to arrange the vibration and noise attenuating characteristics of each of the additional components and elements in a manner which, in combination with the above mentioned panels and components, produces a tuned system, the overall effect of which is reduce the unwanted vibration/noise to the degree where even minute vibrations are shut out.

JU-A-61-187757 discloses a carpet construction of the nature shown in FIG. 6. In this figure, a carpet 1 is laid on top of a metallic vehicle floor panel 2. The carpet, by way of example, comprises a relative rigid polyurethane layer 3 on which an upper decorative layer 5 is disposed.

The vibration and noise which is transmitted from the external surface 2a of the floor panel to the internal one 2b, is attenuated/shut out by the polyurethane layer 3 which in this instance exhibits a rigidity K of about $2.5 \times 10^{-4}/mm^3$, and the decorative flexible layer 5 which exhibits a density of about 1-2 $Kg/m^3$.

With this arrangement, the noise which is experienced by the passenger(s) seated in the front seat(s) of the vehicle is indicated by the ratio of the sound pressure as measured at the front seat(s) and the exciting noise pressure.

FIG. 9 shows the noise characteristics which are experienced in a given type of vehicle cabin wherein no carpet is laid on the floor panel, while FIG. 11 shows the characteristics which are obtained in the same environment but with the above mentioned prior art type of carpet laid.

As will be appreciated from FIG. 11 wherein C1 denotes the characteristics which are produced when the vehicle occupants feet do not rest on the surface of the carpet while C2 denote the characteristics which occur when a passenger or passengers feet rest on top of the carpet. As the characteristics shift quite notably, it is difficult to accurately achieve the desired combination of vibration/noise damping characteristics which are required to achieve a system which will achieve the maximum amount of noise/vibration attenuation.

More specifically, investigations have shown that if a mass M which is representative of the passenger's feet 7, is placed on the upper surface of the carpet 1 in manner to apply a force of about 280 $Kg/m^2$, the characteristics with which vibration is transmitted between the surfaces 2a and 2b shifts, as shown in FIG. 8, from the broken line trace denoted by D2 to that denoted by the solid line trace D1 in a manner wherein the frequency at which the peak transmission ratio thus changes markedly.

In addition, it should be noted that, as shown in FIG. 9 (depicting the case wherein no carpet is laid), the frequency range denoted by A follows a sharp depression T and occurs in the 200-300 Hz range and that, in order to achieve the broadest reduction in the sound pressure in the front seat zone, the carpet is designed to damp the sound in frequency range A. In other words, arranged the carpet is to attenuate noise in the range which follows from one in which noise and vibration radiation is naturally low.

It should also be noted that the prior art carpet is designed so that, as shown in FIG. 10, the transmitivity thereof (viz., the transmitted sound pressure/ the exciting sound pressure) exhibits the characteristics denoted by trace B1 and wherein the peak value P1 is arranged to occur at the same frequency as the marked reduction T. The frequency at which this peak occurs can be derived from the following equation:

$$f_1 = \frac{1}{2\pi} \sqrt{\frac{K}{m}} \quad (1)$$

However, when a passenger's feet rest on the carpet, as shown in FIG. 7, the carpet as a whole, or at least large areas thereof, become compressed and the transmitivity of the carpet changes from the characteristics denoted by B1 to those denoted by B2. As a result the frequency at which peak transmitivity value changes from P1 to P2 by about 50-100 Hz. In other words, if the passenger's feet are represented by the above mentioned mass M then the situation wherein:

$$f_1 = \frac{1}{2\pi} \sqrt{\frac{K}{m + M}} \quad (2)$$

As a result, the tuning which was achieved before the passenger's feet came to rest on the carpet is disturbed in the manner depicted by trace C2 in FIG. 11 and gives to the generation of reverberation noise.

SUMMARY OF THE INVENTION

It is an object of the present invention to provide a carpet which is not effected by the load placed to the degree that the vibration/noise attenuating characteristics of the same are deteriorated in the manner wherein above marked transmitivity peak shifting occurs.

In brief, this is achieved by an arrangement wherein a plurality of small blocks are disposed between an upper flexible layer and a more rigid and thicker layer. The blocks prevent the compression of portions of the carpet surrounding the area on which a load, such as the passenger's feet, is placed. By preventing the compression of the major portion of the carpet, essentially unchanged carpet transmitivity characteristics are maintained. More specifically, a first aspect of the invention takes the form of a carpet comprising: a rigid sheet; an elastomeric layer disposed on the upper surface of said rigid sheet; and a plurality of spaced bocks disposed between said rigid sheet and said elastomeric layer.

A second aspect of the present invention comes in a vehicle which features: a vehicle cabin sound/vibration attenuating system which includes: a carpet the carpet being laid on a metallic panel of the vehicle, the carpet comprising: a first sheet which is disposed in direct contact with the metallic panel, the first sheet having a predetermined rigidity and a first predetermined thickness; a second sheet disposed on the upper surface of the first sheet, the second sheet having a predetermined elasticity; and a plurality of relatively small, spaced and relatively rigid bodies disposed between the first and second sheets.

DETAILED DESCRIPTION OF THE PREFERRED EMBODIMENT

Figure 1:
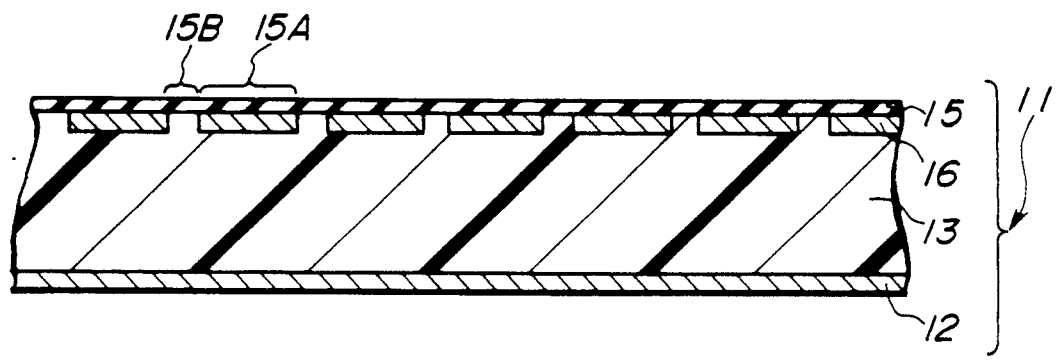
FIG. 1 is a sectional view of a carpet according to the present invention.
Figure 2:
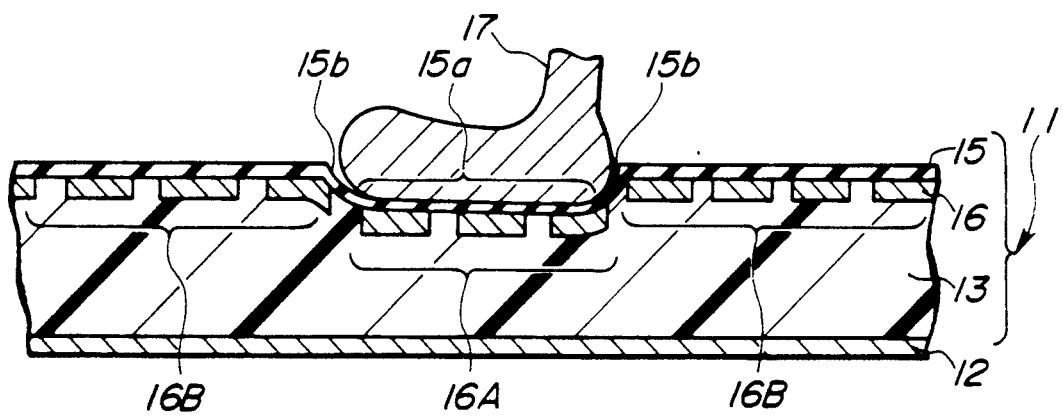
FIG. 2 is a sectional view showing the manner in which the carpet of FIG. 1 accommodates a foot representing mass.
Figure 3:
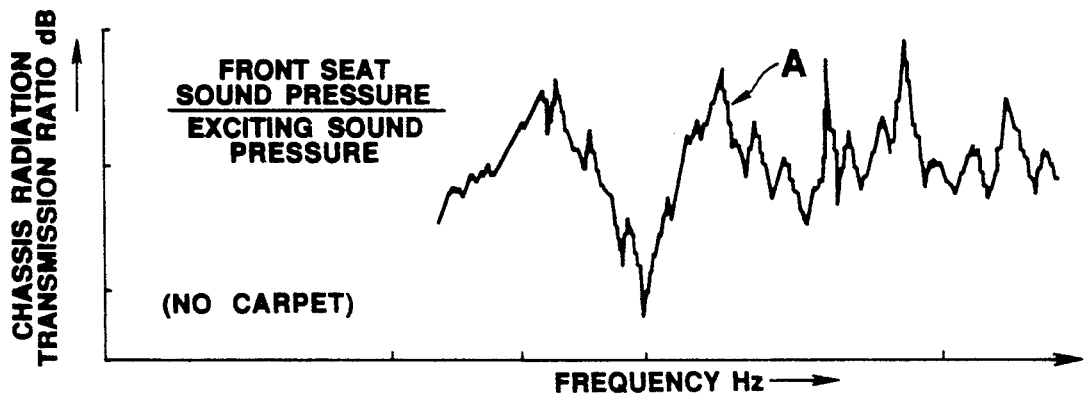
FIGS. 3 to 5 are graphs which demonstrate the sound/vibration attenuating characteristics achieved with the present invention.

FIGS. 1 and 2 show constructional features of an embodiment of the present invention. In this arrangement, a carpet generally denoted by the numeral 11 is laid on a high tensile strength sheet metal floor panel 12 and comprises a polyurethane sheet 13 which exhibits a predetermined degree of rigidity, an elastomeric rubber decorative layer 15 which is disposed on the upper surface of the rigid sheet 13 and a plurality of blocks 16 which are intermittently disposed between the rigid and elastomeric decorative layers 13, 15.

By way of example, the rigid sheet 13 can be about 20-30 mm thick and exhibit a rigidity of about $2.5 \times 10^{-4}$ Kg/mm$^3$. On the other hand, the decorative layer 15 can be about 1 mm thick and can be formed of an elastic rubber such as natural rubber. The blocks 16 in this embodiment are square ($3 \times 3$ cm) and 2-3 mm thick. The blocks 16 therefore exhibit a surface area which is smaller than sole of a passengers foot and are spaced at 1-3 mm intervals and arranged so as to normally not come into contact with one another.

The operation of the above described construction is such that when a passenger's feet are placed on the surface of the carpet, the area beneath the feet undergo localized depression the manner depicted in FIG. 2. As shown in this Figure, a mass 17 which simulates a passenger's foot locally distorts the upper decorative layer 15 and forces a section 15a downwardly. The peripheral portion 15b which surrounds section 15a stretches elastically. This induces a localized compression of the rigid layer 13 and causes a number of blocks 16A which are located below the periphery of the distortion to be independently pressed down to a level lower than the surrounding ones 16B. As the surrounding bocks 16B tend to "float" on the upper surface of the rigid layer 13 they support the upper decorative layer 15 and maintain the portion on which the passenger's feet are not resting at the original height.

Figure 4:
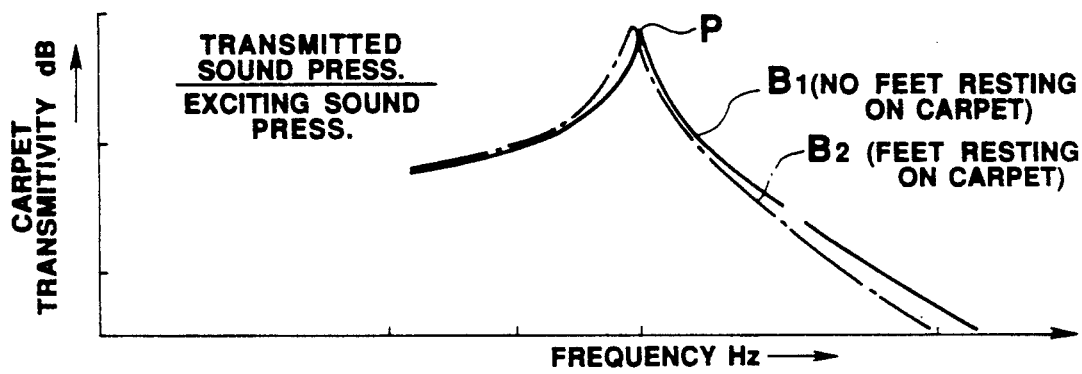
Figure 5:
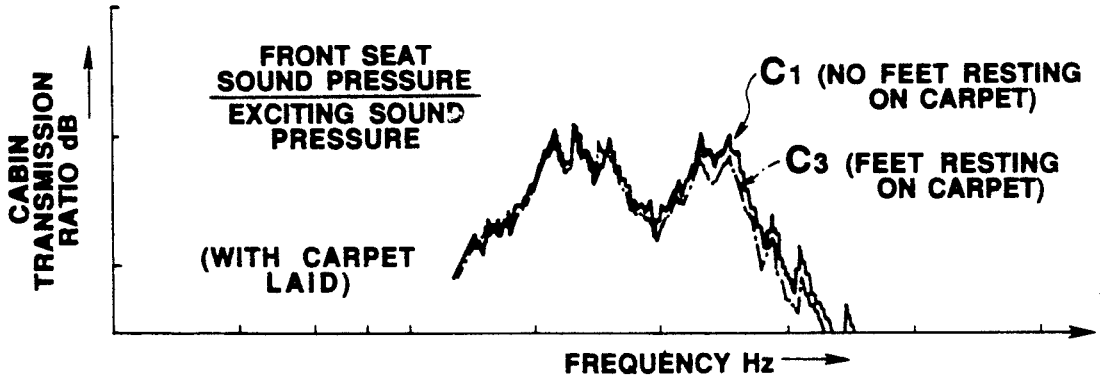
Figure 6:
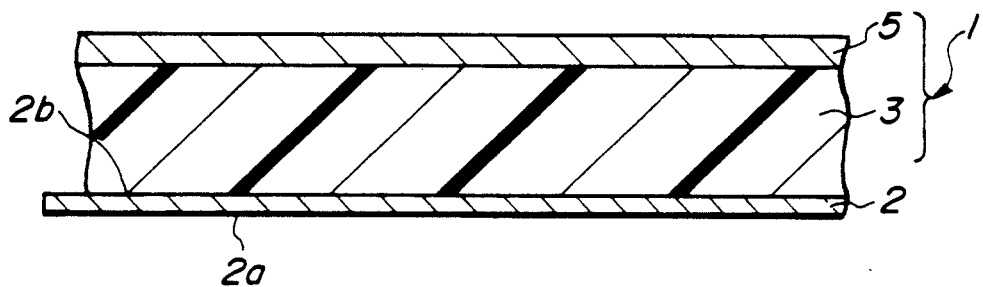
FIGS. 6 and 7 are sectional views showing the prior art carpet discussed in the opening paragraphs of the instant disclosure.
Figure 7:
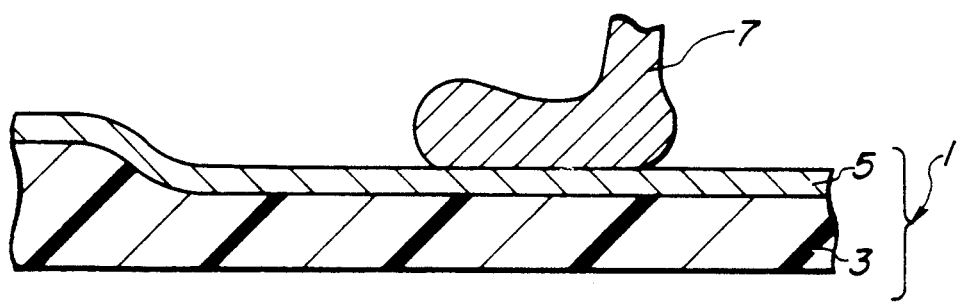
Figure 8:
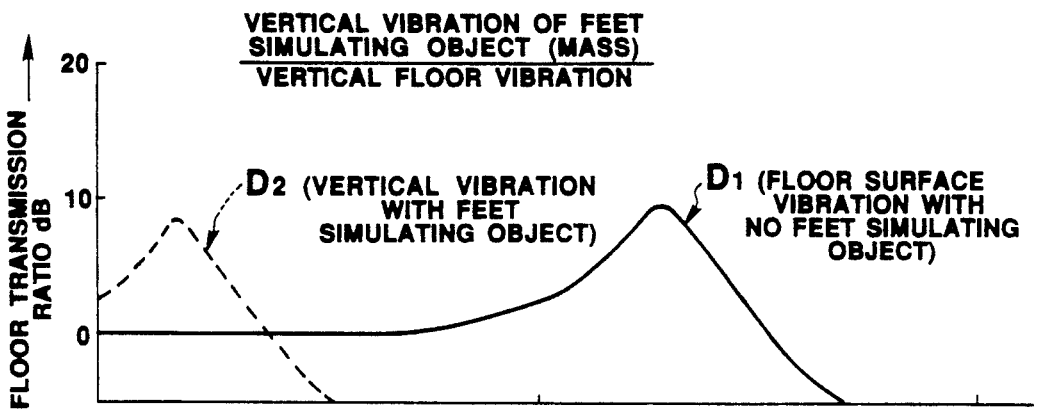
FIGS. 8 to 11 are graphs which demonstrate the problematic sound/vibration attenuating characteristics encountered with the prior art.
Figure 9:
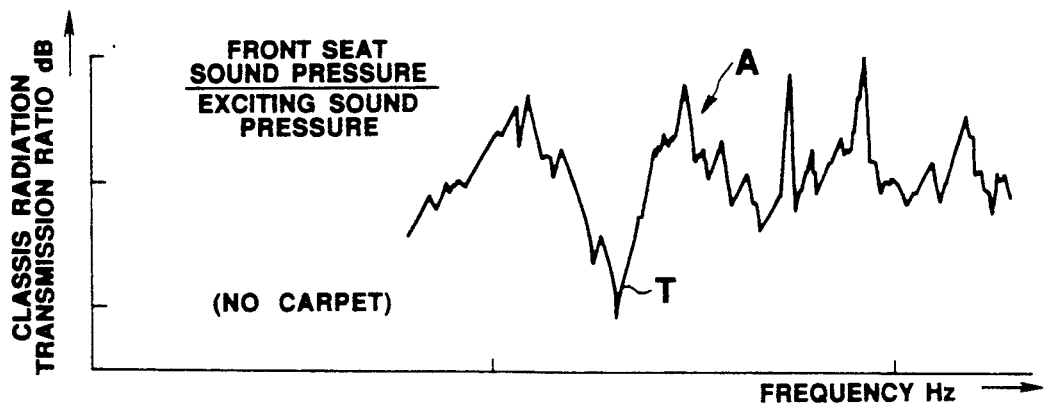
Figure 10:
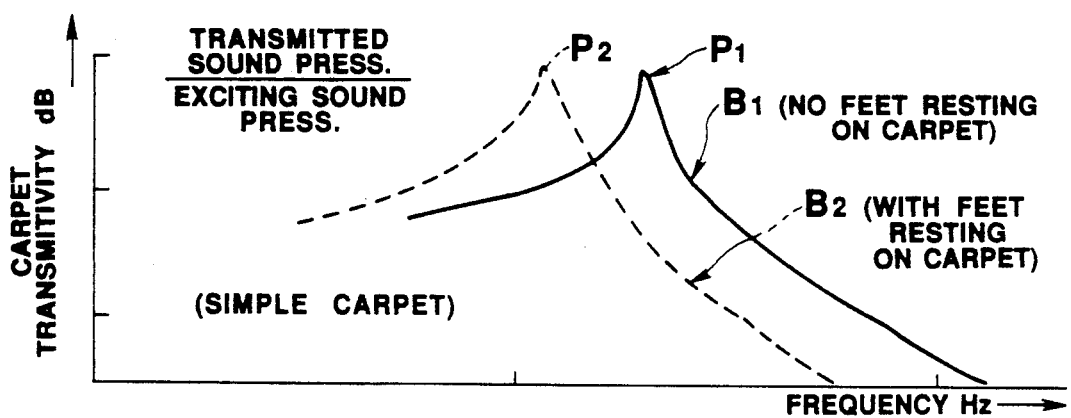
Figure 11:
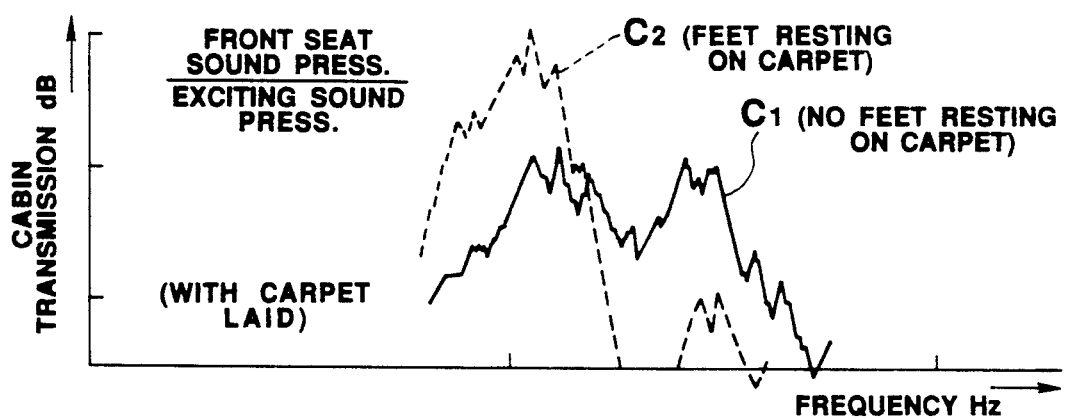

As large areas of the carpet are prevented from being reduced in thickness (e.g. such as shown in FIG. 2) the resulting compression of the rigid layer is prevented and the marked shift in the frequency at which the peak transmitivity of the carpet takes place is prevented as shown in FIG. 4. Accordingly, the attenuating characteristics of the carpet shift only slightly in response to the passenger's feet being placed on the same as indicated by traces C1 and C3 in FIG. 5. The characteristics denoted by trace C3 can be very favorably compared with those denoted by trace C2 in FIG. 11.

With the present invention the tuning of the total sound damping system of the vehicle cabin is not disturbed by the presence or the absence of a load such as the passenger's feet, on the surface of the carpet.

What is claimed is:

1. A vehicular noise insulation carpet comprising:
a polyurethane rigid sheet having a predetermined rigidity;
a flexible elastomeric layer disposed on the upper surface of said rigid sheet; and
a plurality of spaced rigid and incompressible rectangular blocks disposed between said rigid sheet and said elastomeric layer, maintaining the tuned noise and vibration transmitivity characteristics of the carpet constant, both in the absence of a passenger's foot placed on the upper surface of the carpet and with the passenger's foot placed on the same, by attenuating any shift in said transmitivity charcteristics, such that the blocks included in the area beneath the foot placed on said elastomeric layer are only locally pressed down to a level lower than the surrounding blocks;
wherein said blocks are spaced apart from each other at predetermined spaced intervals and each one of said blocks is smaller than a sole of the passenger's foot, to induce the localized compression of said rigid sheet in the presence of the passenger's foot on the upper surface of the carpet.

2. A carpet structure as claimed in claim 1 wherein said rigid sheet is about 20-30 mm thick and exhibits a rigidity of about $2.5 \times 10^{-4}$ Kg/mm$^3$.

3. A carpet structure as claimed in claim 1 wherein said elastomeric layer is approximately 1 mm thick and is formed of natural rubber material.

4. A vehicular noise insulation carpet structure comprising:
a polyurethane rigid sheet having a predetermined rigidity;
an elastomeric layer on the upper surface of said rigid sheet; and
a plurality of spaced rigid and incompressible rectangular blocks disposed between said rigid sheet and said elastomeric layer, for maintaining the tuned noise and vibration transmitivity characteristics of the carpet constant, both in the absence of a passenger's foot placed on the upper surface of the carpet and with the passenger's foot placed on the same, by attenuating any shift in said transmitivity characteristics, such that the blocks in the area beneath the foot placed on said elastomeric layer are only locally pressed down to a level lower than the surrounding blocks: each of said blocks having sides which are approximately 3 cm long and approximately 2-3 mm thick, wherein said blocks are spaced apart from each other at predetermined spaced intervals and each one of said blocks is formed smaller than a sole of the passenger's foot, to induce a localized compression of said rigid sheet when the passenger's foot is placed on the upper surface of the carpet.

5. In a vehicle,
a vehicle cabin noise and vibration attenuating system which includes:
a noise insulation carpet laid on a floor panel of the vehicle, said carpet comprising;

a first polyurethane sheet in direct contact with the panel, said first sheet having a predetermined rigidity and a first predetermined thickness;

a second sheet disposed on the upper surface of said first sheet, said second sheet having a predetermined elasticity; and a plurality of spaced rigid and incompressible rectangular blocks disposed between said first sheet and said second sheet, for maintaining the tuned noise and vibration transmitivity characteristics of the carpet constant, both in the absence of a passenger's foot placed on the upper surface of the carpet laid on the vehicle floor panel and with the passenger's foot placed on the upper surface, by attenuating any shift in said transmitivity characteristics, such that the blocks included in the area beneath the foot placed on said second sheet are only locally pressed down to a level lower than the surrounding blocks;

wherein said blocks are spaced apart from each other at a predetermined spaced interval and each one of said blocks is formed smaller than a sole of the passenger's foot, to induce a localized compression of said first sheet in the presence of the passenger's foot placed on the upper surface of the carpet.

* * * * *